United States Patent [19]

Van Meurs

[11] Patent Number: 5,606,378
[45] Date of Patent: Feb. 25, 1997

[54] CONTACT LENS HAVING AN OPTICAL ZONE HAVING AT LEAST ONE FOCAL POINT

[75] Inventor: Theodorus M. G. Van Meurs, Rotterdam, Netherlands

[73] Assignee: ECU Lens v.o.f., Rotterdam, Netherlands

[21] Appl. No.: 331,171

[22] Filed: Oct. 28, 1994

[30] Foreign Application Priority Data

Oct. 28, 1993 [NL] Netherlands .......................... 9301863

[51] Int. Cl.$^6$ ...................................................... G02C 7/04
[52] U.S. Cl. .......................................................... 351/161
[58] Field of Search ............................. 351/161, 160 R, 351/160 H

[56] References Cited

U.S. PATENT DOCUMENTS

| | | | |
|---|---|---|---|
| 3,279,878 | 10/1966 | Long | 351/161 |
| 4,268,133 | 5/1981 | Fischer et al. | 351/161 |
| 4,618,228 | 10/1986 | Baron | 351/161 |
| 4,618,229 | 10/1986 | Jacobstein et al. | 351/161 |
| 4,813,777 | 3/1989 | Rainville et al. | 351/161 |
| 4,854,089 | 8/1989 | Morales | 51/284 R |
| 5,502,518 | 3/1996 | Lieberman | 351/161 |

FOREIGN PATENT DOCUMENTS

| | | |
|---|---|---|
| 1552106 | 11/1968 | France . |
| 2106499 | 10/1972 | Germany . |
| 895334 | 5/1962 | United Kingdom ................... 351/161 |
| 2033101 | 5/1980 | United Kingdom . |
| 2064158 | 6/1981 | United Kingdom . |
| WO84/04401 | 11/1984 | WIPO . |
| WO86/02462 | 4/1986 | WIPO . |

*Primary Examiner*—Scott J. Sugarman
*Assistant Examiner*—Jordan M. Schwartz
*Attorney, Agent, or Firm*—Young & Thompson

[57] ABSTRACT

A contact lens which has a centrally located optical zone. The optical zone is subdivided into at least one distance area having at least one focal point and at least one reading area having at least a further focal point. The distance area is located exclusively in the uppermost portion and the reading area is located exclusively in the lowermost portion of the optical zone. The upper edge of the contact lens has a greater curvature than the two side edges thereof, so that the shape of the lens is oval having a larger vertical than horizontal dimension. Preferably, the lower edge of the contact lens has a less pronounced curvature than the upper edge thereof and can even have a less pronounced curvature than the side edges, specifically such that the curvature of the lower edge of the contact lens essentially corresponds to the curvature of the lower eyelid of the wearer. For the purposes of more accurate positioning of the contact lens, the thickness of the lens gradually increases from top to bottom.

3 Claims, 2 Drawing Sheets

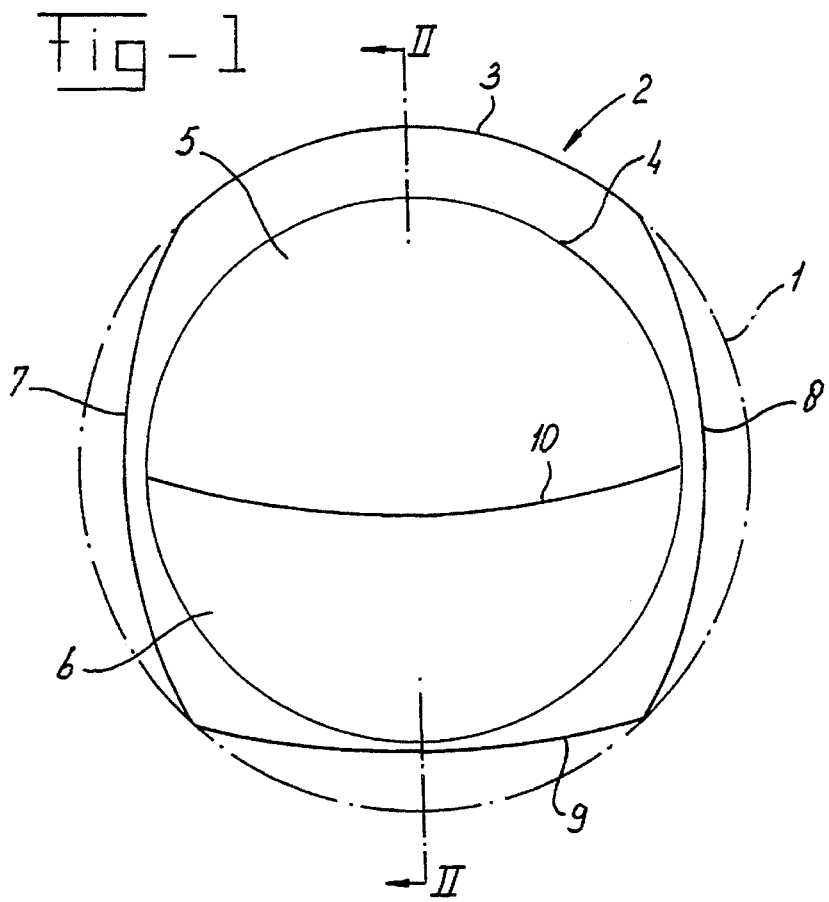
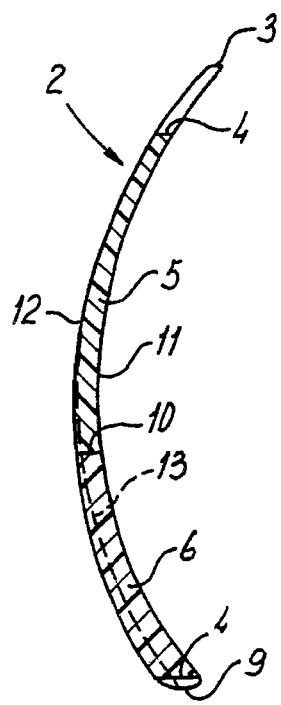
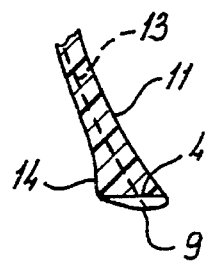

CONTACT LENS HAVING AN OPTICAL ZONE HAVING AT LEAST ONE FOCAL POINT

FIELD OF THE INVENTION

The invention relates to a contact lens which has a centrally located optical zone, which is subdivided into at least one distance area having a first focal point and at least one reading area having a second focal point.

BACKGROUND OF THE INVENTION

A contact lens of this type is generally known.

A known bifocal contact lens, which is available on a small scale, has a curved shape which as far as possible corresponds to the shape of the eye of the wearer. Seen from the front, this contact lens is circular and is provided with a concentric optical zone, which is subdivided into concentric circular layers. In a bifocal lens, the concentric layers have, turn and turn about, a first and a second focal point. In these contact lenses the so-called diffractlye or simultaneous system is used, with which a first image, for example a distant image, is formed by the layers having the first focal point and, at the same time, a second image, for example the reading image, is formed by the layers having the second focal point. This principle is based on the concept that people are capable of separating these images in the brain and of concentrating on one of the two images. When the contact lens wearer wishes to see a distant object, he or she concentrates on the image of the object. The image which this person discerns through the layers having the second focal point is unsharp and blurred, which could assist in concentrating on the first image. It should be possible to apply the corresponding reasoning in the case of a reading image.

However, the known bifocal contact lens has the disadvantage that losses in contrast arise, inter alia as a consequence of the double images. Moreover, it has been found that only a few people have the above-mentioned ability to separate images, with the result that acceptance of the known bifocal lens in practice was highly disappointing.

SUMMARY OF THE INVENTION

The aim of the invention is to provide a contact lens of the type mentioned in the preamble, with which the above-mentioned disadvantages and problems are avoided. Further aims of the invention are the best possible contrast and as high as possible a level of acceptance by lens wearers.

These objectives are achieved according to the invention in that the distance area is located exclusively in the uppermost portion and the reading area is located exclusively in the lowermost portion of the optical zone and in that the upper edge of the contact lens has a greater curvature than the side edges thereof.

This contact lens works in accordance with the so-called alternating principle. The application of this principle is possible because of the above defined dimensions of the upper and side edges of the contact lens by which an oval shape of the contact lens is achieved, as a result of which rotation during wearing of the contact lens is counteracted. Even a contact lens having multiple focal points is now possible.

It is observed that from the U.K. Patent Application No. 2,033,101 A a bifocal contact lens is known, which is not circular. The upper and lower edges of the contact lens are truncated to have a radius somewhat larger than the radius of the lens blank. Consequently the upper edge of the contact lens has a larger radius than the side edges thereof. The stabilising operation is based on the corresponding shapes of the edges of the contact lens and the respective eyelids.

Present inventor has surprisingly found that the contact lens could be stabilised more accurately by shaping the side edges such that the upper edge of the contact lens has a smaller radius, i.e. a greater curvature, than the side edges. This stabilising operation is surprisingly based on the oval shape of the contact lens having a larger vertical than horizontal dimension.

Preferably, the lower edge of the contact lens also has a less pronounced curvature than the upper edge thereof. Starting from the lens blank this flattening of the lower edge may not be such that the vertical dimension of the lens is smaller than its horizontal dimension. Consequently rotation is even better counteracted, and if the curvature of the lower edge of the contact lens is selected to correspond to the curvature of the lower eyelid of the wearer the position of the contact lens is even more accurately defined by the lower eyelid of the wearer.

In a further development of the invention, the thickness of the lens clearly increases from top to bottom, with the result that even better definition of the position of the lens is achieved. It has also been found that in some cases the lower edge of the contact lens must be provided with an additional thickening.

The invention also relates to a contact lens for fittings, which can be part of a set and which has the characteristics of the contact lens according to the invention which has been described above, which contact lens for fittings has the further characteristic that marker points are provided on both side edges of the contact lens a fixed distance above the lower edge thereof. By means of the marker points possible to indicate the correct position of the reading a with respect to the lower edge of the contact lens for production of the contact lens.

BRIEF DESCRIPTION OF THE DRAWINGS

The invention will be explained in more detail below with reference to the drawings. In the drawings:

FIG. 1 shows a front view of an embodiment of a bifocal contact lens according to the invention which is preferably to be used;

FIG. 2 shows a cross-section along line II—II in FIG. 1;

FIG. 3 shows a corresponding cross-section of part of a further embodiment of the contact lens according to the invention;

DETAILED DESCRIPTION OF THE INVENTION

Figure 4:
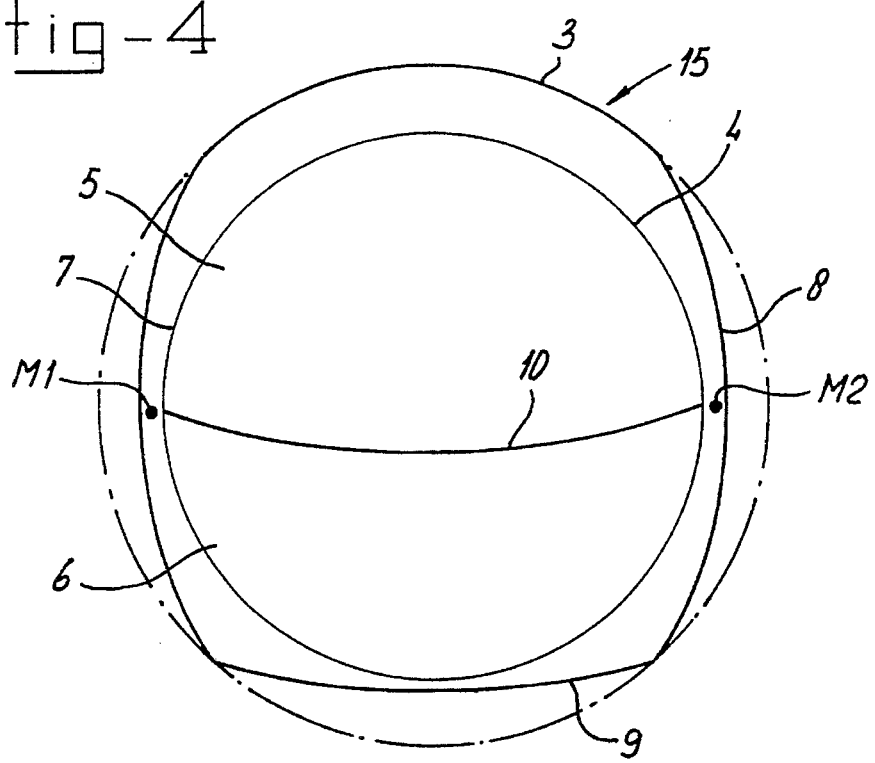
FIG. 4 shows a front view of contact lens for fittings from a set according to the invention.
Figure 5:
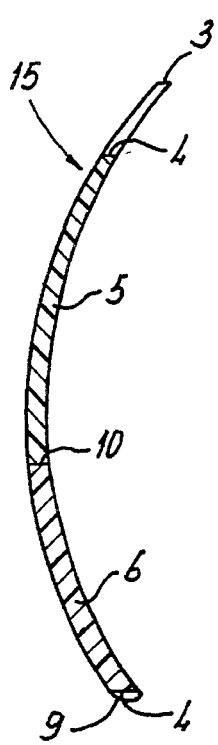
FIGS. 5, 6 and 7 show cross-sections of the contact lenses for fittings from the set according to the invention.
Figure 6:
Figure 7:
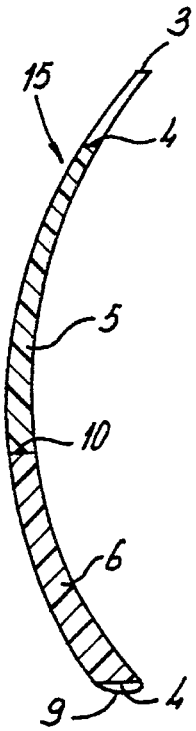

In FIG. 1 the circular edge of a known contact lens is indicated by the broken line 1. The contact lens 2 shown in FIG. 1 has an upper edge 3 which in this embodiment is circular, as in the known contact lenses. The contact lens is provided with an optical zone which at the outside is delimited by the circle 4. The optical zone can, of course, assume any desired shape, depending on the eye to which the contact lens has to be fitted.

The invention is based on the insight that a better image contrast can be achieved because, both for reading and for viewing distant objects, only one image is projected on the retina of the eye. This is what is known as the alternating principle.

It can be seen from FIG. 1 that the optical zone which is delimited by the circle 4 therefore comprises a distance area 5, which is located in the upper part of the contact lens and has a first focal point, and a reading area 6, which is located in the lower part of the contact lens and has a second focal point. However, the alternating principle can not be applied just like that, since the position and angular orientation of the contact lens during wearing thereof is not well defined.

It has been found that by adapting the shape of the bifocal contact lens the position of the contact lens on the eye can be well defined.

A number of measures have been employed in the embodiment of the invention which is shown in FIGS. 1 and 2 and which is preferably to be used, which measures, of course, do not each always have to be used in combination.

In the embodiment shown in FIG. 1, the contact lens is conceptually divided into an upper edge 3, two side edges 7 and 8 and a lower edge 9. The upper edge 3 has a greater curvature, i.e. a smaller radius than the side edges 7 and 8, as a result of which the contact lens as it were acquires such an oval shape that the vertical dimension of the contact lens is larger than its horizontal dimension. This oval shape counteracts twisting of the contact lens on the eye. An even greater degree of counteraction to twisting is achieved because the lower edge 9 has an even less pronounced curvature than the upper edge 3 and even than the side edges 7 and 8. The contact lens is thus truncated at the bottom.

An additional measure for the prevention of rotation of the contact lens on the eye can be seen more clearly in the cross-section in FIG. 2.

The upper edge and the lower edge of the contact lens are indicated by reference numerals 3 and 9 respectively. Below the upper edge 3 the start of the optical zone is indicated by reference numeral 4 and the end of the optical zone just above the edge 9 is indicated by reference numeral 4. In FIG. 2 the interface between the distance area 5 in the upper part of the lens and the reading area 6 in the lower part of the lens is indicated by reference numeral 10. The distance area 5 has a focal point to correct ametropia in the contact lens wearer, whilst the reading area 6 has a second focal point which is needed for correction when reading. The rear surface 11 of the contact lens 2 has a curved shape such that said shape as far as possible corresponds to the topometry of the eye of the wearer. The curvature of the rear surface is termed the base curvature, which, depending on the shape of the eye, can comprise a number of segments of different radii of curvature. A normal spherical geometry is usually assumed for the construction of a contact lens, providing unrestricted possibilities for the diverse fits. The possibilities also include aspherical constructions.

At the bottom of the lens use is made of a truncation (flattened side), which has only a slight curvature and is therefore supported by the lower eyelid of the contact lens wearer. After all, the lower eyelid is slightly curved to some extent and support on the lower eyelid is optimally distributed when the truncation curvature corresponds to the slightly curved shape of the lower eyelid.

The contact lens 2 has a front surface 12, the curvature of which is dependent on the base curvature, the desired focal point for the distance area 5 and the desired focal point for the reading area 6. In the case of a known monofocal contact lens the base curvature for the front surface 12 will continue along the broken line 13 shown in FIG. 2. However, the embodiment shown in FIG. 2 has a thickness which, with respect to the base thickness between the two base curvatures of the rear surface 11 and the front surface 12, Gradually increases from the top to the bottom of the contact lens. Even more accurate delimitation of the position is achieved by this means. In order to ensure correct positioning of the contact lens, in this embodiment use is thus made of a so-called prism ballast, the function of which is to keep the lens in the desired position on the eye, whilst the truncation 9, together with the additional thickening 14, ensures that the lens will not disappear under the lower eyelid when the eyes are moved to the reading position. The additional edge thickening 14 is shown more clearly in FIG. 3.

In the basic concept it will generally be assumed that there is a slightly curved interface (Ultex type) between the distance area and the reading area; however, every model will in fact be suitable for this to a greater or lesser extent, depending on the eye of the wearer. The most important aspect, however, is that the height of the reading area can be set to the requisite height for each wearer. The set for fittings which is shown in FIGS. 4–7 and comprises, for example three (FIGS. 5, 6 and 7) contact lenses for fittings is used for this purpose. FIG. 4 shows the front view of the contact lens for fittings, which in this example has the shape of the contact lens according to FIG. 1. There is therefore no further need to describe the shape of said front view and the cross-sections of the contact lenses for fittings shown in FIGS. 5, 6 and 7.

It can be seen from FIG. 4 that the contact lenses for fittings are provided with two marker points M1 and M2, which are also referred to as reference points, by means of which the height of the reading area can be indicated. In the set for fittings, the reference points are a fixed distance away from the truncation 9 at the bottom of the lens 15. Thus, the only information which has to be given for the production and grinding of the contact lens is the desired deviation with respect to the reference.

The number of possibilities for obtaining the correct fit is actually unlimited and the fit can be determined completely individually for any eye.

Moreover, the optical zone of the lens into which the distance and reading areas are ground can be made larger or smaller and can freely and as much as one needs be subdivided with respect to the diameter of the various zones. Furthermore, the shape and relative position of the distance area and reading area could be modified, for example for an easier manufacturing of the lens.

In general, the diameter of the contact lens does not have to be standard; one particular diameter construction is taken as the basis for the set for fittings, but it will be possible to make this larger or smaller, if necessary.

The set for fittings shown in FIGS. 4, 5, 6 and 7 is based on three contact lenses for fittings, which lenses have differing prism ballasts and/or edge thicknesses, but any number can be chosen for a set for fittings.

The strength of the lens to be produced or supplied is actually unrestricted. The strength of the reading area, which is equal to the distance strength +an addition, referred to as the reading supplement, can be ground in a simple manner.

By use of the measures and possibilities described above it is therefore possible to produce a custom made bifocal contact lens and thus to obtain an optimum match with respect to the correct relationship between distance and reading areas, as a result of which it is possible to obtain optimum vision for both distance and close viewing without all sorts of troublesome ocupital complaints which arise with so-called simultaneous bifocal constructions.

A very great advantage of the invention is that, as a result of the accurate positioning of the contact lens, it is possible to produce even a multifocal contact lens with which sharp images can be generated and a high level of acceptance achieved.

I claim:

1. Contact lens having a substantially oval shape, an upper edge, a lower edge, side edges, and being subdivided into at least one distance area located in an upper part of the lens and having at least one focal point, and at least one reading area located in a lower part of the lens and having at least another focal point, said upper edge having a greater curvature than the side edges, said lower edge having a less pronounced curvature than the upper edge and the side edges, said curvature of the lower edge essentially corresponding to the curvature of the lower eyelid of a wearer, and said lower edge including a thickening region, wherein the vertical dimension of the lens extending from the upper edge to the lower edge is larger than the horizontal dimension extending between the side edges.

2. Contact lens according to claim 1, wherein the thickness of the lens gradually increases from top to bottom.

3. Contact lens for fittings having a shape according to claim 1, and further including marker points located close to the side edges of the contact lens a fixed distance above the lower edge.

* * * * *